United States Patent [19]

Hillum et al.

[11] Patent Number: 5,249,202
[45] Date of Patent: Sep. 28, 1993

[54] RADIO COMMUNICATION

[75] Inventors: Richard A. Hillum, Laindon; Ian S. Parry, Richmond, both of United Kingdom

[73] Assignee: Linear Modulation Technology Limited, United Kingdom

[21] Appl. No.: 669,630

[22] Filed: Mar. 14, 1991

[30] Foreign Application Priority Data

Mar. 14, 1990 [GB] United Kingdom ............... 9005750

[51] Int. Cl.⁵ .............................................. H04B 1/26
[52] U.S. Cl. ..................................... 375/77; 375/97; 455/32.1; 455/46; 455/47; 455/71; 455/164.1; 371/5.1
[58] Field of Search ....................... 455/31, 32, 35, 46, 455/47, 70, 71, 161, 164, 257, 258, 259, 265, 31.1, 32.1, 161.1, 164.1; 371/5.1, 5.4, 47.1; 331/4; 380/32, 38, 39; 375/9, 43, 77, 97

[56] References Cited

U.S. PATENT DOCUMENTS

| | | | |
|---|---|---|---|
| 3,840,811 | 10/1974 | Blouch | 455/32 |
| 4,009,442 | 2/1977 | Bromssen | 455/228 |
| 4,434,504 | 2/1984 | Fredrickson | 455/32 |
| 4,551,855 | 11/1985 | Kurosaki et al. | 455/32 |
| 4,625,331 | 11/1986 | Richardson | 455/35 |
| 4,792,984 | 12/1988 | Matsuo | 455/32 |

FOREIGN PATENT DOCUMENTS 0095685 7/1983 European Pat. Off. .

OTHER PUBLICATIONS

IEEE Transactions on Communication Technology, vol. COM 32, No. 1, Jan. 1984, New York, U.S. pp. 81-87, GcCeehan et al. "Phase-Locked Transparent Tone-In-Band (TTIB): A New Spectrum Configuration Particularly Suited to the Transmission of Data Over SSB Mobile Radio Networks".

*Primary Examiner*—Benedict V. Safourek
*Attorney, Agent, or Firm*—Antonelli, Terry, Stout & Kraus

[57] ABSTRACT

In a transparent tone-in-band (TTIB) single-sideband-modulated communication system used to communicate digital data; to compensate for variations due, eg, to doppler shift of the pilot tone in the received signal, during the sweep of the frequency of a local oscillator used to tune the receiver, the output of a narrow band filter is monitored for the presence of the expected pilot tone. When the pilot tone appears to be present, the sweep is interrupted and the error rate of the demodulated digital signal is tested, the sweep being resumed if an excessive error rate is encountered.

12 Claims, 5 Drawing Sheets

Band-Split at 1750Hz

Band-Split at 1550Hz

RADIO COMMUNICATION

The present invention relates to radio communication, and particularly but not exclusively to the provision of means to ensure that a single sideband radio receiver uses the correct local oscillator frequency to demodulate a single sideband transmission to baseband.

In a single sideband transmitter the baseband (audio frequency) signal is translated upwards to a radio frequency by one or more stages of linear frequency mixing with associated filtering processes. The several means by which this translation may be achieved are not directly relevant to this invention, except to note that the net result of any of the means is to cause each input baseband component at frequency $f_i$ to be linearly translated to the radio frequency $f_t$, where:

$$f_t = (f_o + f_i)$$

In a single sideband receiver, one or more linear mixing and filtering processes may be used to return the radio frequency signal to baseband. The sum of the frequency translations thereby carried out must equal $f_o$ if the original baseband signal is to be recovered without frequency error.

Without loss of generality it may be assumed that the subject receiver employs only one mixing stage and has a local oscillator with a frequency error $\pm \Delta f_o$. In such case the recovered baseband frequency components are $(f_i \pm \Delta f_o)$, where every component is in error by $\pm f_o$.

In many fixed point-to-point communications applications the receiver may employ a high accuracy local oscillator to maintain $\Delta f_o$ within negligible proportions. However, in applications such as satellite communications, HF communications or land mobile communications the doppler effect due to relative motion of the transmitter and receiver (or motion of the ionosphere for HF) causes the transmitted signal $f_t$ to be shifted in frequency (relative to the receiver) by $\pm f_d$, where $f_d$ is the doppler shift. In general, $f_d$ is not known in advance and varies with time and cannot be compensated for in the local oscillator without deriving information from the received signal.

As an example, if the receiver is moving at 30 m/s (67 mph) relative to the transmitter the doppler shift as a radio frequency of 220 MHz is approximately equal to 22 Hz, and is proportionately greater at higher radio frequencies or faster speeds.

Where the uncorrected baseband frequency error exceeds about 20 Hz, speech begins to sound unnatural and data modems may produce high error rates. In the latter case, high error rates arise from the combined effects of the recovered baseband signal movement towards (or outside) the bandwidth of the modem filters and the destruction of harmonic relationships in the baseband signal. In some coherent modems (eg, using Quadrature Amplitude Modulation) loss of clock synchronisation can occur with a frequency error as small as a few Hz.

Hence, to provide means for correction for doppler shift it is usual to transmit a low level reference tone together with the baseband signal. The reference tone may be a pilot carrier (referencing the zero frequency of the baseband), or it may be a tone inserted just above the baseband, or it may be a transparent tone in band. In the receiver, conventional baseband recovery techniques involve a search technique—as shown in FIG. 3 of the accompanying drawings—which involves sweeping the receiver's local oscillator until a tone (assumed to be the reference tone) is located in a narrowband filter with centre frequency equal to the frequency of the tone inserted at the transmitter.

However, in the case of a low signal-to-noise ratio in the receiver and/or in the presence of multipath fading, the initial identification of the reference tone may be difficult or impossible. The problem is made worse if the transmission comprises a continuously radiated data signal. In this case the transmitted signal may have a complex waveform with many peaks in its power spectral density, and a conventional receiver may easily lock on to a spurious tone, and has been found to do so in practice.

For the purposes of the present specification a multi-channel radio communication system is one in which a section of the radio frequency spectrum is divided into a number of channels which are used for independent transmissions, and a co-channel transmission is a transmission in the same channel as a transmission of interest. The channels are typically 5 kHz wide.

The first aspect of the present invention uses the decoding and error detection properties of a data signal to test whether the receiver has locked onto the reference tone, and if not causes the local oscillator sweep to continue until the correct lock has been obtained.

Thus a first aspect of the invention provides a method of, and receiver apparatus for, receiving a radio signal which comprises a pilot tone signal having, prior to modulation and transmission, a predetermined reference frequency, and a digital data signal whose data error rate varies in dependence on the frequency error of the tuning of the receiver to the received signal.

According to this aspect of the invention, the frequency of a local oscillator used at the receiver to demodulate the received radio signal is swept while circuits in the receiver monitor the demodulated signal for a frequency component at the expected frequency of the pilot tone and control circuits interrupt the sweep and hold the frequency of the local oscillator signal at its current value when the demodulated signal is suggestive of the reference pilot tone signal being correctly tuned, testing the digital data error rate of the demodulated digital data signal and recommencing the sweep if that test yields an excessive error rate.

This aspect of the invention thus provides a receiver apparatus for receiving a radio signal which comprises a pilot tone signal having, prior to modulation and transmission, a predetermined reference frequency, and a digital data signal whose data error rate varies in dependence on the frequency error of the tuning of the receiver apparatus to the received signal, the receiver apparatus having a demodulator and a local oscillator for producing an output signal, of controllable frequency, for demodulating the received signal, the demodulator being operative to demodulate the received digital data signal using the oscillator output signal, means for controlling the local oscillator to sweep its output frequency and for interrupting the sweep and holding the frequency of the local oscillator signal at its current value when the demodulated signal is suggestive of the reference pilot tone signal being correctly tuned, means for testing the digital data error rate of the demodulated digital data signal and recommencing the sweep if that test yields an excessive error rate.

A second aspect of the invention provides a method of receiving a radio signal which comprises a pilot tone signal having, prior to modulation and transmission, a predetermined reference frequency, and a digital data signal whose data error rate varies in dependence on the frequency error of the tuning of the receiver to the received signal, sweeping the frequency of a local oscillator used at the receiver to demodulate the received radio while circuitry in the receiver monitors the demodulated signal for a frequency component at the expected frequency of the pilot tone interrupting the sweep and holds the frequency of the local oscillator signal at its current value when the demodulated signal is suggestive of the reference pilot tone signal being correctly tuned, testing the digital data error rate of the demodulated digital data signal and recommencing the sweep if that test yields an excessive error rate.

This aspect of the invention provides, inter alia, two different approaches to the problems encountered in co-channel operation of a number of geographically distributed transmitters, where co-channel breakthrough can cause distortion and other incorrect processing of the received signal. This problem is particularly acute in the case where the technique known as Feed-Forward Signal Regeneration (FFSR) is incorporated in the receiver signal processing to reduce the effects of multipath propagation of the wanted signal (see J P McGeehan and A Bateman. Theoretical and Experimental Investigation of Feed-Forward Signal Regeneration as a Means of Combating Multipath Propagation Effects in Pilot-Based SSB Mobile Radio Systems. IEEE Transactions on Vehicular Technology, Vol VT-32, No 1, February 1983). The FFSR technique is commonly used in connection with the Transparent Tone In Band (TTIB) type of pilot tone communication (see U.S. Pat. No. 4,679,243).

Two alternative techniques can be used to minimise the effect of a co-channel transmission on the reception of a wanted transmission, which in each case results in the radio frequency of the reference pilot tone from the wanted transmitter being received on a detectably different frequency than a pilot tone from a co-channel transmitter. Detection of the pilot tone is, in each case, carried out by a narrowband (typically 75 Hz) filter in the receiver. Thus, by offsetting the pilot tone in the co-channel transmission by an amount (typically 100 Hz), which allows for doppler shift and the bandwidth of the pilot tone detection filter, the reception of a pilot tone from only the wanted transmitter is achieved when correct demodulation of the wanted transmitter has been carried out, for example, by use of the first aspect of the invention.

Thus, the second aspect of the invention provides a multi-channel radio communication system in which the radio frequency of the pilot tone from a co-channel transmitter is offset from the pilot tone of the wanted transmitted by offsetting the entire co-channel transmission by, for example, 100 Hz upwards or downwards in frequency within the channel. This is practicable since within a typical 5 kHz wide channel assignment there is a guard band at either side of the actual signal, which only takes up a bandwidth of 3100 Hz (see FIG. 1(c)).

The third aspect of the invention provides a multi-transmitter radio communication system in which the radio frequencies at the band edges of the co-channel signal transmission are the same as from the wanted transmitter, but in this aspect the format of the co-channel transmission is changed so as to place the co-channel pilot tone at a different position within the channel than the co-channel signal (see FIG. 5), so that again reception of a pilot tone from only the wanted transmission is achieved when correct demodulation of the wanted transmission has been carried out, for example, by use of the first aspect of the invention It should be noted that the second and third aspects of the invention do not claim to provide a panacea to the problem of co-channel interference generally, but are simply intended to ensure that the pilot tone of a co-channel transmission falls outside the bandpass window of the filter within the receiver which is used to pass the pilot tone of the wanted transmission so as to eliminate interference between the pilot tones of the wanted and co-channel transmissions. This is necessary where a receiver is operating in a region in which the level of signal received from a co-channel transmitter is significant relative to the level of the signal received from the wanted transmitter, since in such circumstances there is a probability that under multipath fading conditions the unwanted co-channel transmission may be received for short periods at a signal level of the same order of strength as the wanted signal. When this occurs, the reference tone from the unwanted co-channel transmission may capture the receiver's frequency control and cause disruption of the communications link. Moreover, even if complete capture of the receiver's frequency control does not occur, a second tone close to the reference tone (ie, within the narrowband tone detection filter) results in a spurious amplitude modulation of the reference tone at half the difference in frequency between the two tones (see Professor W Gosling. A Quasi-synchronous VHF SSB System. University of Bath conference proceedings on Recent Mobile Radio Research, February, 1979). In these circumstances, the FFSR circuit in the receiver will employ inappropriate corrections to the wanted signal, resulting in distortion of the recovered baseband.

The invention also provides transmitters and receivers adapted to operate in accordance with any one of the above aspects of the invention.

The invention will be further described by way of non-limitative example with reference to the accompanying drawings, in which:

FIGS. 1(a)-(c) are spectrum charts used to illustrate the principles of SSB TTIB communication.

Figure 3:
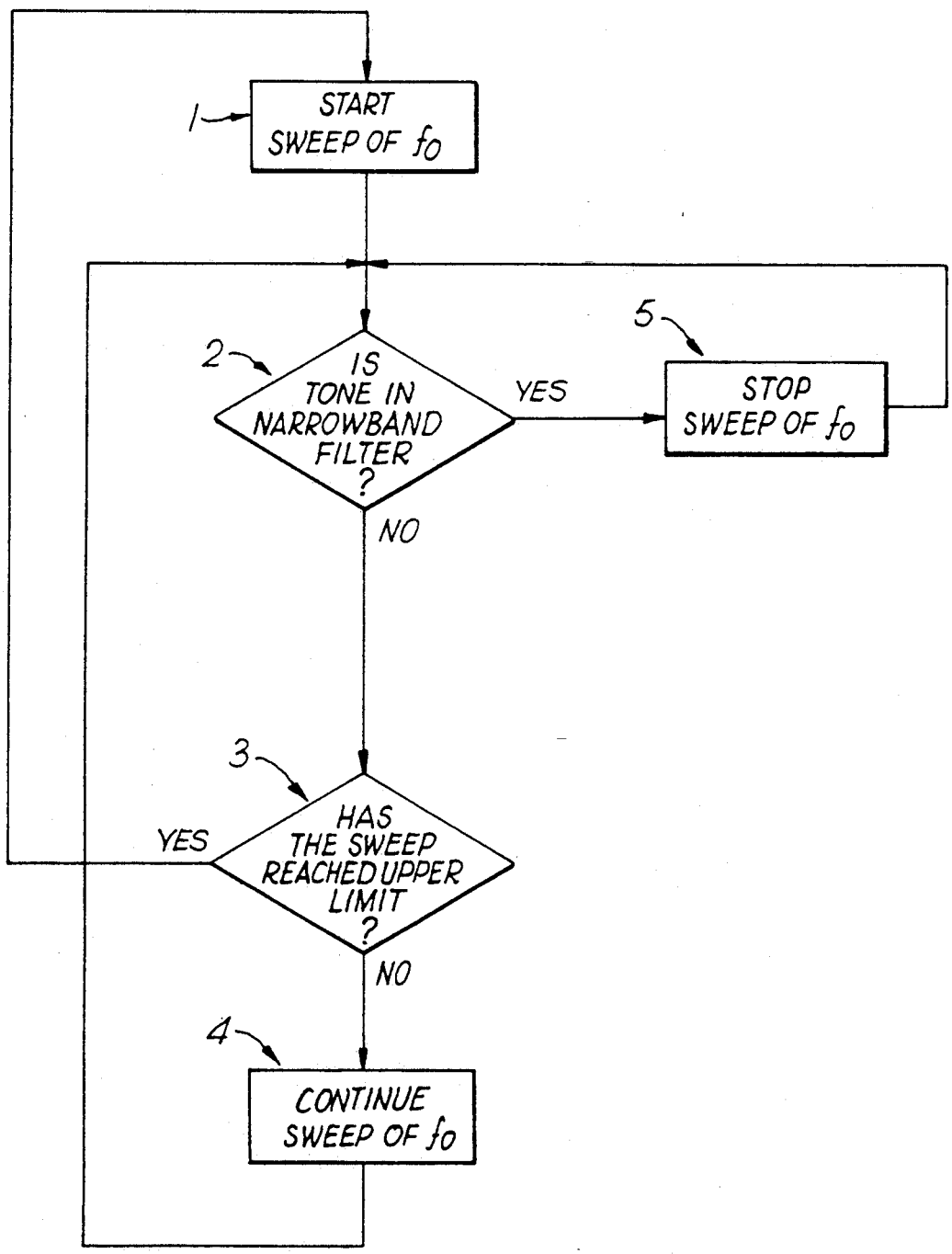
FIG. 3 is a flow chart showing how the conventional search for the tone $f_o$ is conducted.

FIG. 3 of the accompanying drawings shows the conventional use of a reference tone in a radio receiver to minimize the effects of local oscillator frequency error and doppler shift.

By way of example, reference is made to a land mobile radio receiver operating in conjunction with a transmitter radiating control channel signals to the UK MPT 1327 and 3 1347 standards, and in which the reference tone is used in accordance with the Transparent Tone in Band (TTIB) technique (see U.S. Pat. No. 4,679,243). The TTIB signal processing may be carried out by any of the means described in the cited patent and the signal processor (normally a microcomputer or DSP microcircuit) is additionally used to filter out the reference tone. This is typically achieved by digital implementation of a fixed narrowband filter, which is centered on the expected frequency of the reference tone when the local oscillator has been correctly offset to compensate for the combined effects of its inherent frequency error and for doppler shift.

To locate the reference pilot tone in the filter passband the local oscillator frequency is swept from a value of about 2 ($\Delta f_o + f_d$) below its nominal frequency to the same increment above its nominal frequency. This both in the prior art and in the present invention may be achieved by conventional means, using typically a ramp voltage waveform to vary the output of a voltage controlled oscillator employed in a frequency or phase locked loop frequency generation circuit.

Figure 1:
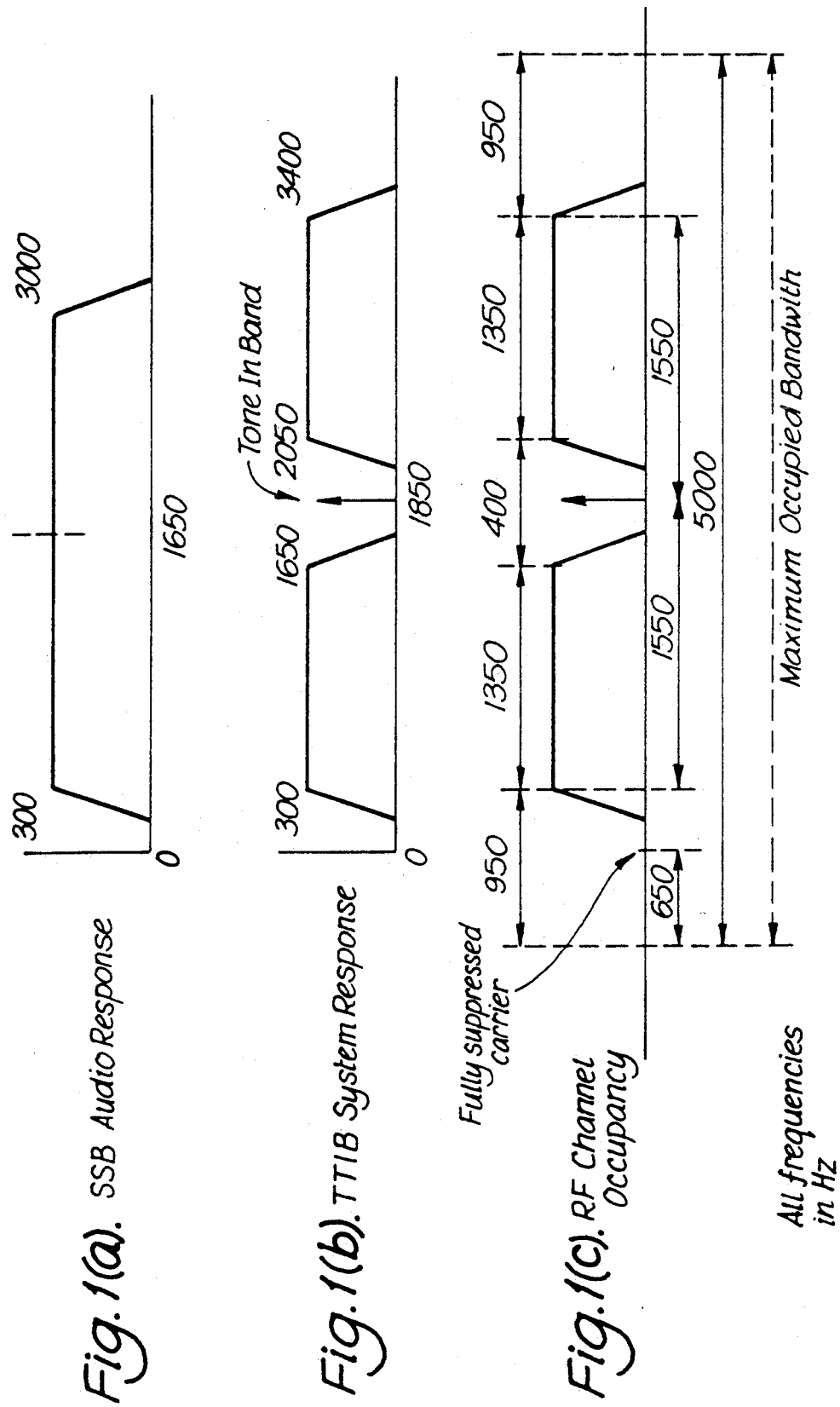

FIG. 1(a) shows the baseband (audio) spectrum of a typical SSB communication channel, having a bandwidth of 300–3000 Hz. In conventional SSB transmission, signals in the channel are amplitude modulated onto a carrier and the one of the two resulting sidebands is suppressed prior to transmission, so that only the carrier and other sideband are transmitted.

In TTIB processing, prior to modulation, the audio band is split into upper and lower halves centered, eg, on 1650 Hz, and the upper half is then translated up in frequency, resulting in two bands spaced, say, 400 Hz apart, as shown in FIG. 1(b), and a reference pilot tone is inserted at the centre of the gap between the two bands, ie, at 1850 Hz in this example. This is the basis of the TTIB technique, "in band" referring to the fact that the pilot tone is within the audio-frequency base-band signal and the "transparent" referring to the fact that because of the frequency split and shift of the baseband signal, the tone though present in the baseband part of the spectrum does not intrude into the baseband signal. The resulting signal is then amplitude-modulated onto a carrier for transmission and both the lower side band and carrier are suppressed, giving a transmitted signal with the RF channel occupancy as shown representatively in FIG. 1(c). The RF signal shown at FIG. 1(c) may also be produced from the signal shown at FIG. 1(b) by the Weaver method of modulation.

At the receiver, the TTIB pilot signal is used, by a suitably designed signal processing circuit to reconstruct the original signal baseband signal.

Figure 2:
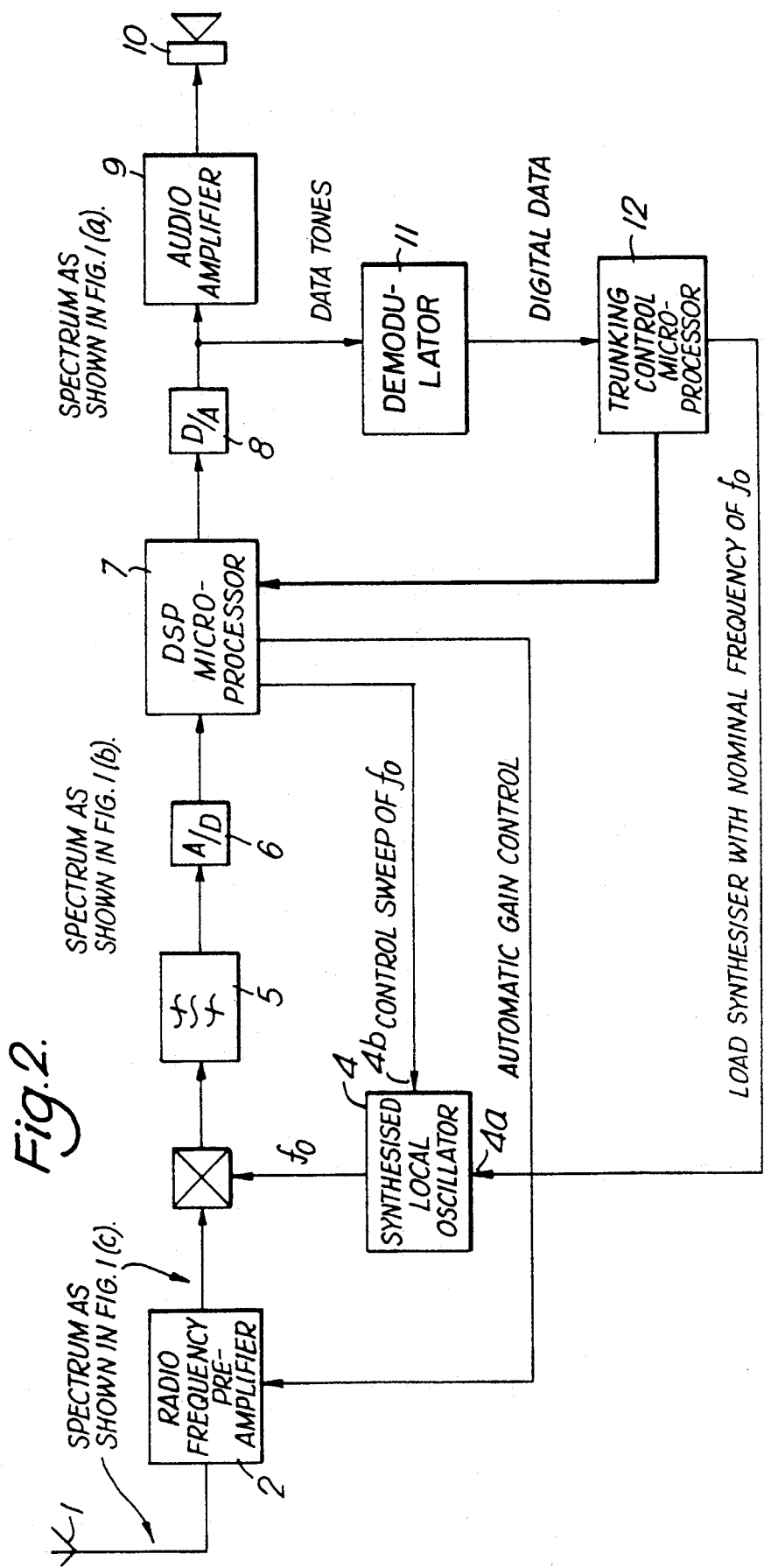
FIG. 2 is a block diagram of an embodiment of the invention.

FIG. 2 is a block diagram of a TTIB receiver incorporating circuitry embodying the present invention. A radio frequency TTIB signal received by an aerial 1 is amplified by a radio frequency preamplifier 2 and fed to a linear mixer 3 where it is mixed with a reference frequency signal produced by a synthesised local oscillator 4. At the input to the mixer 3, the signal has a spectrum as shown in FIG. 1(c).

Oscillator 4 has two inputs which control the frequency of the reference frequency signal, namely a "load" input 4(a) which receives a value setting the nominal value $f_{on}$ of the frequency $f_o$ and a "sweep" input 4b which controls a variation of the frequency of the signal $f_o$ produced by the oscillator 4 from its nominal value $f_{on}$. The setting of $f_{on}$ and its variation will be described below.

The output of the mixer 3 is fed through a band pass filter 5, whose output has the spectrum shown in FIG. 1(b), to an analogue to digital converter 6, so that the resulting digital signal can be processed by a digital signal processor 7. This processor 7, inter alia, digitally processes the signal so as to reconstitute a digitised version of the original signal, per FIG. 1(a), which is then fed through a digital to analogue converter 8 to an audio amplifier 9 and thence to a loudspeaker 10, so that the audio signal can be heard. Processor 7 may also produce an automatic gain control signal for the radio frequency preamplifier 2 so that its output is maintained at a suitable level for processing by the subsequent circuitry.

Processor 7 subjects the signal to narrowband pass filtering with the frequency characteristics of the passband set to pass signal components at the expected frequency of the pilot tone (processor 7 may be programmed by trunking control microprocessor 12 described below. to set particular values for this frequency in accordance with the particular transmission to be received) so that a suitably high level of signal energy in the passband is suggestive of the presence of the pilot tone.

The output of D/A converter 8 is also applied to an FFSK data demodulator 11 to recover any digital data in the received channel, the recovered data being supplied to a trunking control microprocessor 12. At this point it may be noted that in current proposals a number of TTIB transmission channels (known as control channels) are used, one on each of the various radio sites to transmit trunking information which indicates the current allocation of channels (known as traffic channels) to communications between different users of the system. As with the DSP 7, the functionality and design of the trunking control microprocessor will be sufficiently well known by those skilled in the art as not to require description here, except to the extent that as compared with the conventional forms of these devices, on which they may be based, they require adaptation to implement the present invention.

Figure 4:
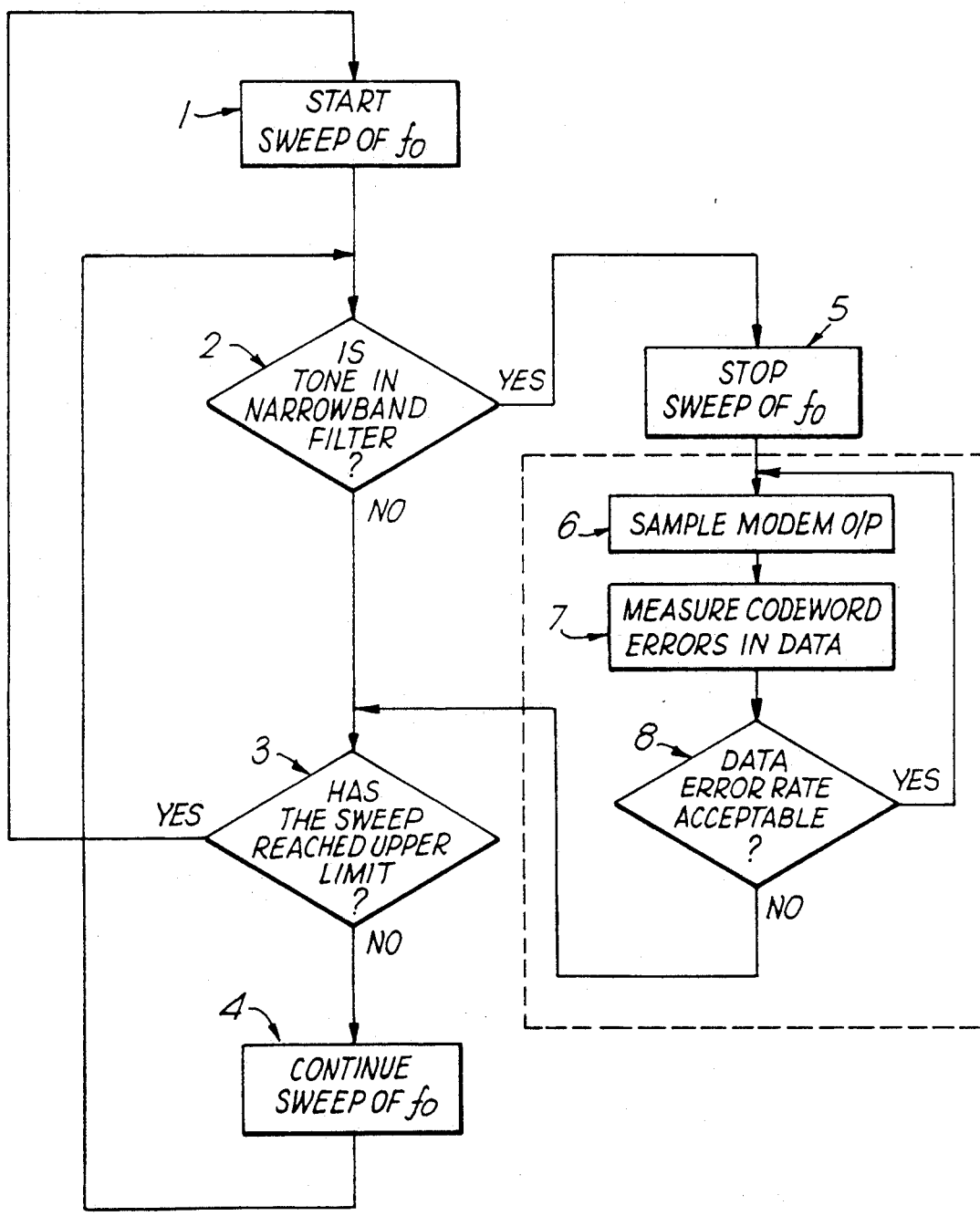
FIG. 4 shows how the search is carried out in the illustrated embodiment of the invention.

FIG. 3 of the accompanying drawings shows how the frequency sweep is conventionally conducted. Block 1 of FIG. 3 indicates the start of one cycle of the frequency sweep, and block 2 tests whether a tone has been detected in the narrowband filter used to detect the pilot tone. If not, block 3 tests whether the required upper limit of the frequency sweep has been reached; if so, the sweep is restarted at its lower frequency limit but, if not, the sweep continues as indicated by block 4. However, when a tone is detected at block 2 the sweep of the local oscillator is stopped as indicated at block 5. In conventional automatic frequency control circuits the assumption is then made that the reference tone has been identified in the narrowband filter and that the local oscillator has been correctly set. However, this may be an incorrect assumption, which results in a (potentially very large) frequency error in the recovered baseband signal. To overcome this difficulty the first aspect of this invention utilises an additional control loop around the data recovered from the baseband signal, so that the sweep is carried out as shown in FIG. 4.

In the MPT 1327/1343 example, the baseband carries Fast Frequency Shift Keying (FFSK) data at 1200 bits/second using codewords each comprising 64 bits, including 16 error detection bits. These codewords are sampled at the output of the FFSK data demodulator 11 by trunking control microprocessor 12 as shown at block 6, and a measurement of codeword errors is made at block 7. Because of the filtering, clock recovery and data detection processes implemented in a standard FFSK modem, any frequency error in the baseband of more than about 20 Hz causes a very rapid rise in the codeword error rate with frequency error. Consequently, the test of correct decoding of codewords at block 8 confirms with a high degree of confidence that the wanted reference tone (and not a spurious tone) has been selected, and the sweep of the local oscillator is stopped by the trunking control microprocessor 12 signalling the digital signal processor to do so. An unacceptable error rate in the codewords at block 8 causes the sweep to continue.

The ultimate accuracy in the setting of the receiver demodulation when the local oscillator sweep has been stopped depends on the bandwidth of the tone detection filter and on other implementation techniques, including whether or not the FFSR technique is incorporated in the frequency control process. Hence, in this example, the present invention is used only to confirm that the correct reference tone has been selected for the receiver's precision frequency control circuits to operate on, and the invention is intended to improve the performance of such circuits.

After the correct reference tone has been selected in accordance with the first aspect of the invention the correctness of this selection may be further checked by arranging for each control channel transmitter periodically to send a unique identity code as part of its data transmission. This function is routinely carried out by control channel transmitter operating to the MPT 1327/1343 standards.

Furthermore, the second and third aspects of the invention may be utilised on any of the traffic channels (as well as on control channels) after the receiver has been "locked" to the pilot tone of the wanted control channel in accordance with the first aspect of the invention. This is possible because the absolute accuracy of the receiver local oscillator in stepping in fixed 5 kHz increments from a control channel to a subsequent traffic channel is greatly superior to its inherent accuracy in first locating the absolute frequency of the wanted control channel.

By way of continuing the example of the application of the invention to radio systems operating to the UK MPT 1327/1343 standards, it may also be used with advantage in such systems when operating on multiple radio sites. In such a case, spectrum efficiency is improved if any given radio frequency can be re-used with the minimum of geographic separation between co-channel sites. This results in the maximum system capacity expressed in Erlangs per MHz per sq km.

However, where a receiver is operating in a region where it can receive co-channel signals, there is a possibility, as earlier explained, that even a low level of co-channel interference may seriously disrupt the efficient operation of the FFSR signal processing. Thus, the pilot tone of a co-channel transmitter should be offset in radio frequency from the pilot tone of the wanted transmission to minimise this disruption, so as to allow the maximum possibility for frequency re-use. Typically the pilot tone from the co-channel transmitter should be offset in frequency from pilot tone from the wanted transmitter by an amount equal to about the bandwidth of the narrowband tone detection filter plus the maximum expected doppler frequency. For example, in practical applications the tone detection filter may be 75 Hz wide, and with a maximum doppler frequency of 22 Hz (as in the earlier example) a frequency offset at about 100 Hz will ensure filtering of the reference tone from interference by the tone from a co-channel transmitter.

This frequency offset between the pilot tone of the co-channel and the wanted channel transmissions may be achieved in two possible ways, which are respectively the subject of the second and third aspects of the invention.

In regard to the second aspect of the invention it may be seen from FIG. 1(c) that in the RF Channel Occupancy there is a possibility of "sliding" the spectrum upwards or downwards in frequency by up to 950 Hz, while still remaining inside the assigned 5 kHz bandwidth channel. In practice, some of this frequency tolerance is needed to accommodate base station transmitter frequency errors (typically less than 22 Hz at 220 MHz for a 0.1 ppm base station frequency standard as would be required to implement the proposed offset frequency working), and some tolerance is needed to allow filters in the transmitter sufficient guard band to provide high attenuation against the radiation of spurious signals into an adjacent 5 kHz channel, ie, filters need some frequency bandwidth in which to "roll-off" from their pass band (no attenuation)to their attenuation band (80 dB down typically). Nevertheless, within the practical limitations of base station transmitter frequency stability and filter design, there remains some spare part of the 5 kHz channel within which the transmitted spectrum of interest may be deliberately offset from its nominal value by up to about 100 Hz and still remain wholly within the 5 kHz bandwidth of the assigned channel.

Figure 5A:
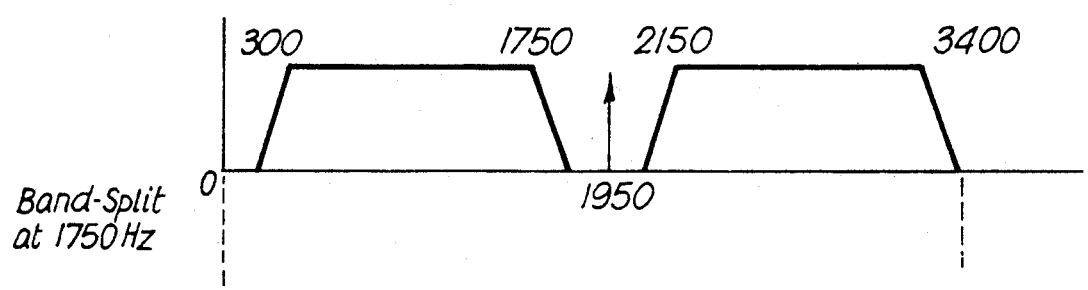
FIG. 5 illustrates the third aspect of the invention.
Figure 5B:
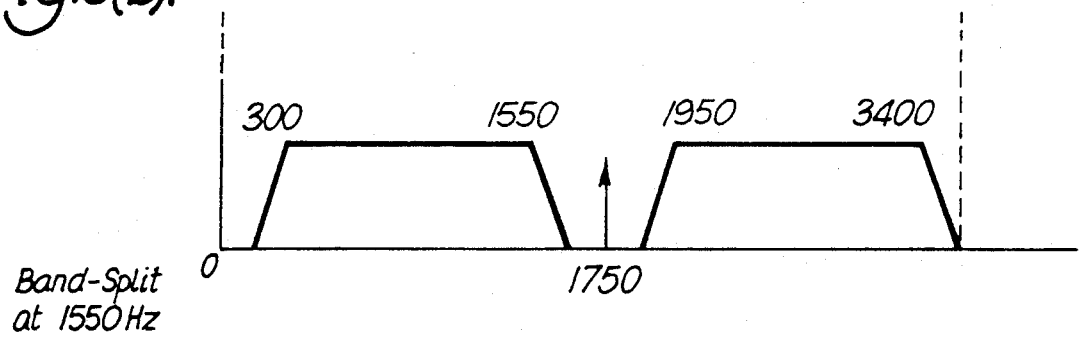

However, instead of moving the complete TTIB spectrum of the co-channel transmitter up or down by (say) 100 Hz as proposed in the second aspect of the invention, according to the third aspect of the invention the audio split point may be changed as in FIG. 5. This has the effect, in the example given, of moving the pilot tone upwards by 100 Hz (in FIG. 5(a) or downwards in FIG. 5(b)) without affecting the location of the upper and lower limits of the spectrum within the assigned 5 kHz channel. Thus in the third aspect of the invention, the modulation circuitry in the transmitter and the demodulation circuitry in the receiver may be programmed, or pre-set, with suitable values for the upper and lower pass band audio frequencies and the pilot tone frequency, such that the co-channel uses different values for the frequencies of the audio split point and the pilot tone.

In regard to the third aspect, the mobile receiver may need to "know" the changed format of the transmission if it were required to demodulate a co-channel transmission. This would be the case if the co-channel base station transmitter was one forming part of a network over which the mobile was permitted to communicate; it might, however, be a part of someone else's network. In the latter case each type of mobile would only be required to demodulate (in the sense of reconstructing the two parts of the TTIB audio spectrum) the single signal format appropriate to its own network.

On the other hand, if the co-channel transmitter(s) was/were part of a single network with standard (FIG. 1(b)) signal format on some sites and with a co-channel standard (FIG. 5(a)) signal format on other sites, and possibly also the alternative co-channel standard (FIG. 5(b)) signal format on yet other sites, the mobile would be required to "demodulate" two or three slightly different signal formats. In such case the mobile would also need to transmit on the format adopted by the base station with which it was currently communicating.

Adaption of the mobile to reconfigure to the formats of FIGS. 1(b), 5(a) or 5(b) can be by means of a look-up table within the mobile receiver software, which would cause the digital signal processing to change the parameters of the internally computed digital filters. Where multi-format processing is required, however, the mobile will have no a priori knowledge of the appropriate signal format (of the three possibilities given by way of example), and in this case, on first moving into the coverage area of a different base station, the mobile will need to attempt decoding on all three formats; with a powerful DSP microcomputer this might conceptually be possible in parallel, but in practice a sequential decoding process would most probably be adopted. With reference to FIG. 3, in block 6 the step of "sample modem O/P" would initially be made after processing of the signal in each of the possible signal formats until the correct format had been identified.

Thus, in summary, the invention provides:

a) confirmation that an SSB receiver has locked on to the correct reference tone in a pilot tone or pilot carrier single sideband transmission; and b) improved frequency re-use in a multi-transmitter radio system by allowing co-channel transmitters with offset frequencies to be located geographically closer than would otherwise be practicable.

We claim:

1. A receiver apparatus for receiving a radio signal which comprises a modulated pilot tone signal and a modulated digital data signal whose digital data error rate when demodulated varies in dependence on the frequency error of the tuning of the receiver apparatus to the received signal, the digital signal having, prior to modulation, spectral components within a baseband spectrum and the pilot tone having, prior to modulation, a baseband predetermined frequency relative to said spectral components, the receiver apparatus having a demodulator and a local oscillator for producing an output signal, of controllable frequency, for demodulating the received signal, the demodulator being operative to demodulate the received digital data signal and pilot tone signal using the oscillator output signal by frequency translating the modulated pilot tone and modulated digital signal down to their baseband frequencies, means for controlling the local oscillator to sweep its output frequency and for interrupting the sweep and holding the frequency of the local oscillator signal when the demodulated signal comprises a signal component at said predetermined reference frequency of the pilot tone signal, means for testing the digital data error rate of the demodulated digital data signal and recommencing the sweep if that test yields an excessive error rate.

2. Apparatus according to claim 1 and including a narrow band-pass filter for receiving the demodulated signal and for passing signals at the reference frequency of the pilot tone signal, to provide an output indicative of the presence of signal components at that frequency.

3. Apparatus according to claim 1, comprising means for receiving a radio signal which is transmitted in suppressed carrier, single-sideband-modulated form, the demodulator being adapted to demodulate a radio signal received in that form.

4. Apparatus according to claim 3, wherein said radio signal is in transparent tone-in-band form, that is with the data signal prior to transmission being split into two frequency bands, the content of one band being translated in frequency relative to the other band to leave a band gap into which the pilot tone signal is inserted, the receiver being operative to remove the pilot tone signal and to frequency translate the content of the one band to close the band gap and to reconstruct the data signal.

5. Apparatus according to claim 1, and including means for determining an expected pilot tone signal frequency for a particular channel of the radio frequency spectrum and for setting the local oscillator output signal frequency to a value appropriate to sweep a range of carrier frequencies which will result in the pilot tone, if received, being detected.

6. A method of receiving a radio signal which comprises a modulated pilot tone signal and a modulated digital data signal whose digital data error rate when demodulated varies in dependence on the frequency error of tuning of the receiver to the received signal, the digital signal having, prior to modulation, spectral components within a baseband spectrum and the pilot tone having, prior to modulation, a baseband predetermined frequency relative to said spectral components, said method comprising sweeping the frequency of a local oscillator which is used at the receiver to demodulate the received radio signal while monitoring a resulting demodulated signal for a frequency component at an expected frequency of the pilot tone, interrupting the sweeping and holding the frequency of the local oscillator signal when the demodulated signal comprises a signal component at said predetermined reference frequency of the pilot tone signal, testing the digital data error rate of the demodulated digital data signal and recommencing the sweep if that test yields an excessive error rate.

7. In a radio communication system in which a first transmission takes place in a designated channel of the radio frequency spectrum and may be subject to co-channel interference from a second transmission in that channel, the first and second transmissions comprising a respective modulated pilot tone and a respective associated modulated digital data signal, the pilot tone in the first transmission having, prior to modulation and within a baseband spectrum a predetermined frequency and the pilot tone in the second transmission having, prior to modulation and within that baseband spectrum a frequency which differs by a detectable amount from said predetermined frequency, a method of receiving the first transmission comprising:

receiving and demodulating the first transmission with the steps:
i) using a local oscillator to produce a local oscillator signal,
ii) using the local oscillator signal to demodulate the received transmission,
iii) sweeping the local oscillator frequency while monitoring the demodulated received signal,
iv) interrupting the sweeping of the local oscillator frequency when the demodulated signal contains a signal component at said predetermined frequency, and
v) while the sweeping of the local oscillator frequency is interrupted, testing the demodulated digital signal to determine a digital data error rate of the demodulated digital signal and recommencing the sweeping of step iii) if the testing determines if the digital data error rate is greater than a set value.

8. A method according to claim 7 in which the spectra of the first and second transmissions each occupy only central region of the channel.

9. A method according to claim 8 in which the difference between frequencies of the pilot tones of the first and second transmission are achieved by translating the second transmission up or down in frequency in the channel relative to the expected position of the first transmission.

10. A method according to claim 9 wherein the first and second transmissions are of suppressed-carrier single-sideband-modulated signals.

11. A method according to claim 10 wherein the first and second transmissions are of transparent tone-in-band form.

12. A method according to claim 8 in which the production of the signals forming the first and second transmissions each involve splitting the frequency spectrum of a signal to be transmitted into upper and lower parts, frequency translating the signal components in one of the parts to leave a gap between the two parts and inserting the pilot tone in the gap, and the difference in pilot tone frequencies between the two transmissions is achieved by selecting and using a different frequency at which to split the signal components of the first transmission than for those of the second transmission.

* * * * *